2 Sheets—Sheet 1.

G. J. SHIMER.
Cutter Head.

No. 9,403. Reissued Oct. 12, 1880.

Witnesses:
Frank L. Durand,
Jas. H. Clark.

Inventor:
George J. Shimer,
by Hylmen & Kane,
Attorneys.

N. PETERS, PHOTO-LITHOGRAPHER, WASHINGTON, D. C.

G. J. SHIMER.
Cutter Head.

No. 9,403. Reissued Oct. 12, 1880.

*Witnesses:*
Fred. G. Dieterich,
A. H. Krause.

*Inventor:*
George J. Shimer,
by Heylmun & Kane,
Attorneys.

N. PETERS, PHOTO-LITHOGRAPHER, WASHINGTON, D. C.

UNITED STATES PATENT OFFICE.

GEORGE J. SHIMER, OF MILTON, PENNSYLVANIA.

CUTTER-HEAD.

SPECIFICATION forming part of Reissued Letters Patent No. 9,403, dated October 12, 1880.

Original No. 159,226, dated January 26, 1875. Application for reissue filed August 19, 1880.

*To all whom it may concern:*

Be it known that I, GEORGE J. SHIMER, of Milton, in the county of Northumberland and State of Pennsylvania, have invented certain new and useful Improvements in Cutter-Heads; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
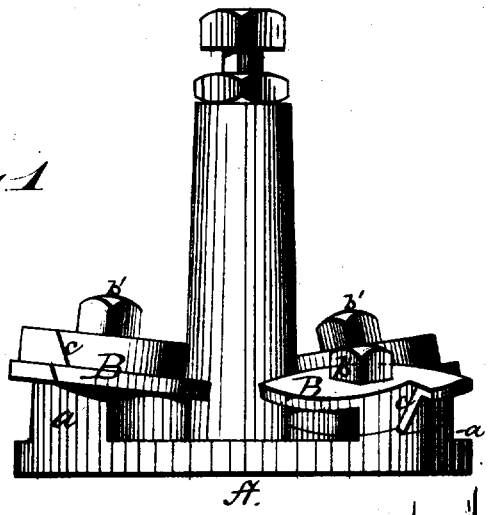
Figure 3:
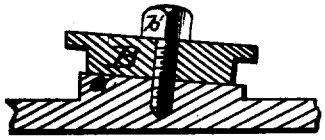
Figure 4:
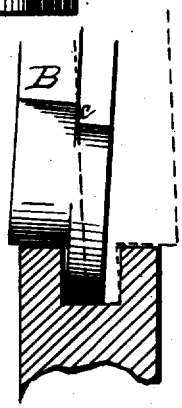
Figure 2:
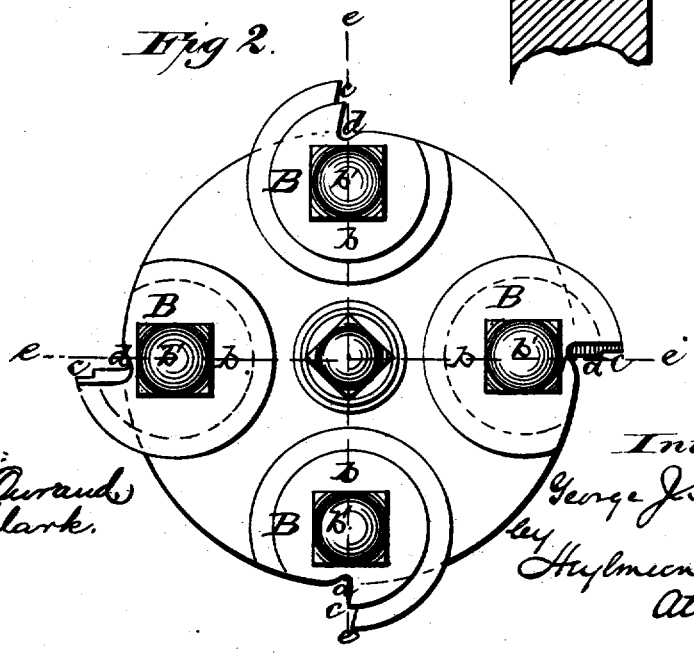
Figure 5:
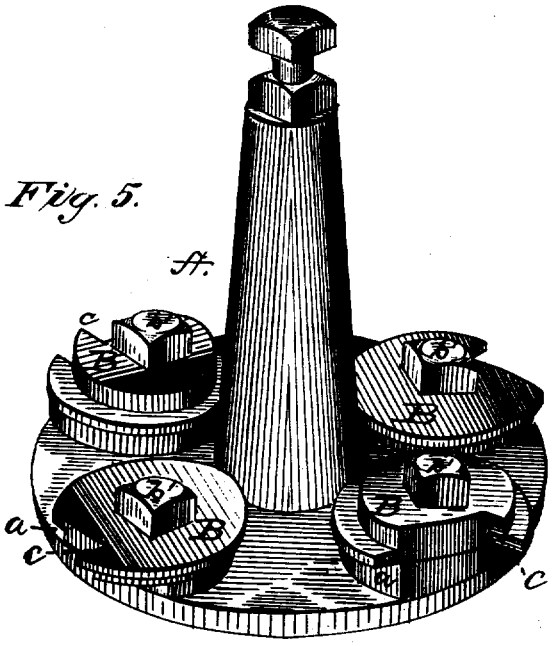
Figure 6:
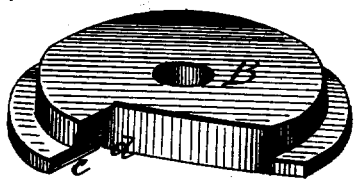

Figure 1 is a side elevation of my improvement. Fig. 2 is a face plan of same. Fig. 3 is a transverse central section of one of the bits and its seat. Fig. 4 is an edge view of one of the bits, showing mode of operation. Fig. 5 is a perspective view of the complete tool. Fig. 6 is a perspective view of one of the cutters.

My invention relates to that class of cutter-heads that are used in matching and molding machines for matching, grooving, and finishing the edges of lumber.

My invention also relates to cutters for matching, grooving, and finishing the edges of lumber.

Matching-cutters, when made of one piece of steel, are in use subjected to a lateral wear. Thus the part of the cutter that cuts the groove wears continually narrower, while the points on the cutter forming the tongue wear apart, and will not, therefore, make a uniform tongue and groove. Matching-cutters, when made of three pieces, which are in common use, have been set obliquely; but the device is defective in that the adjustment of the cutters is left to the skill of the workman. When movable bits are employed there is always a necessity for the utmost care as to their setting and fastening, as the least inaccuracy in the one or insecurity as to the other may lead to objectionable or disastrous results.

To obviate the defects of these devices I fashion the bits so that they overlap each other on the line of cut, in order that the work of each will conform to its portion of the outline and secure them to seats with inclined faces, so that said bits will be brought accurately into position with the proper clearance for each cutting-edge.

I have devised a circular bit and secure it to the head by a screw-bolt through its axis. This form of bit I prefer because of its durability, convenience, and safety, and should the bolt holding it become loosened it could not fly out, but would simply turn back and not cut.

My invention consists in a matching-head having seats with oblique faces, to which the bits are secured with perfect accuracy, said seats having the faces alternately inclined, so that the bits will be correspondingly inclined for clearance.

My invention further consists in a cutter-head having upper and lower seats alternately arranged and alternately inclined, in combination with cutters or bits having two cutting-edges conforming with the outline of a little more than one-half of the shape to be produced.

My invention further consists in a cutter-head provided with four seats, the upper and lower seats alternately arranged and alternately inclined, in combination with four circular cutters that divide the chip upon a central line of cut.

My invention further consists in shaping a matching-cutter or bit so that the edge of its transverse section will correspond with the outline of little more than one-half of the shape to be produced.

My invention further consists in a grooving-cutter having two cutting-edges conforming with the outline of a little more than one-half of the shape to be produced.

My invention further consists in the construction of the parts and their combinations, as will be hereinafter more fully set forth and specifically claimed.

In the annexed drawings, forming a part of this specification, the letter A represents the cutter or matching head, to which the bits are attached. This head A consists of a flange with a central hub, of proper size, bored out to fit a mandrel, upon which it is to run, and is fastened thereto in the usual manner.

At four points, as shown at *b b b b*, (see Fig. 2,) equidistant from the center of the head, I form the seats *a a*, having their faces oblique to the plane of revolution and eccentric to the cutter-head and exterior to the axis of rotation, the two higher seats being inclined rearwardly and slightly inwardly, and the two lower seats being inclined forward and slightly outwardly. The object of forming these seats as described is to secure an inclined surface upon the head, in order that the cutters secured thereto may work with the proper clearance and occupy the proper position with relation to each other on the same head.

The bit may be clamped to the face of the seat *a* by any proper means; but I prefer to employ a circular bit having a hole at its axis, through which a screw-bolt may be inserted to hold said bit firmly in place.

The circular bit is designated in the drawings by the letter B, and is shown secured to the head by the screw-bolt *b'*. The knife or cutting-edges *c* (see Figs. 1 and 2) are formed by cutting a throat obliquely across the edges of the bit, as shown, the obliquity of the edge being just equal and opposite to the inclination of the bit, so as to produce a square cut, as shown in Fig. 4, and it becomes a right or left hand cutter, according to the direction of said obliquity.

In setting the bits B the outer cutting-edge or point is adjusted about one-eighth of an inch back of a line, *e*, which would cut the axis of the head and bit, so that the cutting-edge has sufficient clearance behind it. This adjustment may be made exact by means of a proper gage, but can be made with sufficient exactness by the eye. A slight variation will not perceptibly change the depth of cut.

Each of the bits or cutters has two cutting-edges. One knife-edge of the cutter shapes the lumber on one side of the groove, and the other knife-edge of the same cutter cuts part of the groove only, overlapping a central line in the bottom of the groove, as seen in Fig. 4, or on the ridge of the tongue, as the case may be.

My cutters are always used in pairs, consisting of upper and lower cutters, set alternately on higher and lower inclined seats in operation. The bits cut alternately, each pair completing a full cut across the edge of the lumber operated upon.

The advantages of thus shaping the knife-edges of matching-cutters and working them in pairs by securing them to higher and lower inclined seats upon a matching-head are these: First, a division of the cut, usually made in matching the edges of lumber, is effected by two cutters working alternately, which prevents tearing and splitting; second, clearance is given the cutters with perfect accuracy; third, the tongue and groove can be enlarged or made smaller, thus suiting one set of cutters to work the various thickness of lumber.

It will be seen that the bit or cutter B is shaped so that the edge of its transverse section will correspond with the outline of a little more that one-half of the shape to be formed.

By the employment of a circular bit, which is secured by a screw-bolt through its axis, the cutting-edge cannot be out of place as to its distance from the center of rotation, and being circular, its cutting-edge may continually recede with successive sharpenings without decreasing its diameter, and always admitting of readjustment of the cutting-edge to a common circle.

If the holding-bolt *b'* should become loosened it would be impossible for any disaster to occur, because the bit could neither fly out nor cut deeper, but would merely turn backward and cease to cut at all. It will therefore be perceived that with my circular bit complete safety from accident is secured, and successive sharpenings cannot change the relative cutting-edges nor introduce any complications into the process of setting.

When it is necessary to sharpen the bits it is accomplished by grinding or filing out the throat *d* and the face of the tooth *c* without changing the figure of the cutter.

It is obvious that a bit shaped so that the edge of its transverse section will correspond with the outline of a little more than one-half of the shape to be formed may be clamped to the face of an inclined seat upon a matching-head by any proper means; but, as stated before, I prefer to employ a circular bit having a hole at its axis through which a screw-bolt may be inserted to hold the bit firmly in place.

Having thus described my invention, what I claim as new, and desire to secure by Letters Patent, is—

1. A matching-head provided with seats having their faces oblique to the plane of rotation and alternately inclined, in combination with circular cutters arranged in series which partially overlap each other on the inner line of the cut, substantially as described.

2. The combination, with a cutter-head having higher and lower seats alternately arranged and alternately inclined, of cutters, each having two cutting-edges conforming with the outline of a little more than one-half of the shape to be produced, substantially as described.

3. A cutter-head provided with four seats, consisting of higher and lower seats alternately inclined, in combination with four circular cutters or bits arranged in series, and that partially overlap each other on the inner line of the cut, substantially as described.

4. A cutter-head provided with four seats arranged in series and alternately inclined, and having their faces oblique to the plane of rotation eccentric to the cutter-head and exterior to the axis of rotation, substantially as described.

5. A matching-head provided with seats having their faces oblique to the plane of rotation, in combination with cutters or bits arranged in series which partially overlap each other on the inner line of the cut, substantially as described.

6. A matching-head provided with seats having their faces oblique to the plane of rotation and exterior to the axis of rotation, in combination with cutters or bits arranged in series which partially overlap each other on the inner line of the cut, substantially as described.

7. A circular cutter or bit constructed as set forth, combined with a revolving cutter-head provided with seats having inclined faces eccentric to the cutter-head and exterior to the axis of rotation, as described.

In testimony whereof I affix my signature in presence of two witnesses.

GEO. J. SHIMER.

Witnesses:
SAMUEL J. SHIMER,
IRENE E. MILLER.